United States Patent Office.

EUGENE N. RIOTTE, OF NEW YORK, N. Y.

PROCESS OF REFINING AMALGAM OF GOLD AND SILVER CONTAINING BASE METALS.

SPECIFICATION forming part of Letters Patent No. 253,888, dated February 21, 1882.

Application filed September 28, 1881. (No specimens.)

*To all whom it may concern:*

Be it known that I, EUGENE N. RIOTTE, of New York, in the county of New York and State of New York, have invented certain new and useful Improvements in Processes for Treating Gold and Silver Ores and Refining Amalgam; and I do hereby declare that the following is a full, clear, and exact description of the invention, which will enable others skilled in the art to which it appertains to make and use the same.

The object of my invention is to provide a process of refining amalgam of gold and silver by reducing the base metals contained therein to insoluble compounds which may be readily separated from the elements which it is desired to obtain in a pure state. This I accomplish by generating in or introducing to the barrel or closed vessel containing the amalgam sufficient chlorine gas to form insoluble chlorides of the base metals—as, for instance, $Cu_2Cl_2$ and $PbCl_2$, which are the insoluble chlorides of copper and lead—so that when such insoluble chlorides are washed out of the amalgam the gold and silver will alone remain combined with the mercury as an amalgam, and on retorting the amalgam the gold and silver are obtained. The insoluble chlorides being separated may be suitably treated, so that the copper and lead may be saved. Ordinarily amalgam formed at mining reduction-works usually contain, in addition to the mercury, gold and silver, more or less copper, lead, and other base metals, according to the nature of the ore which has been treated. This amalgam has therefore to be refined—a process which consists in separating the copper, lead, and other base metals from the compound, leaving the gold and silver in marketable condition. The common method of accomplishing this result requires considerable time and skill in manipulation, and is quite expensive.

In refining amalgam by my process it is placed in a common Frieberg barrel, and, if desired, may be thinned out with mercury. To this I add any chlorine-generating compound—such as sulphuric acid, salt, and manganese—so that sufficient chlorine may be generated to form insoluble chlorides of the base metals contained in the amalgam—as for instance, insoluble chlorides of copper and lead. After having first determined by weight and analysis the amount of base metals in the amalgam, I then determine the amount of chlorine necessary to transfer them into chlorides. Of course it is well known by metallurgical chemists the exact amount of chlorine any given weight of chlorine-generating materials will produce. Hence, having determined the exact amount of base metals, I know precisely the amount of materials required to obtain the necessary quantity of chlorine. If more convenient, the chlorine may be generated in another vessel and introduced through the trunnion to the material in the barrel. The barrel is started and run until all chemical reaction ceases, which will generally be in from three to six hours. The barrel is then filled with water and allowed to run at half-speed for about one hour. The contents are then discharged into a wooden settler. Here all the insoluble chlorides which have been formed are washed out and settled in a tank, the quicksilver, with the amalgam, being drawn as usual into a separate receptacle and strained. The insoluble chlorides, after partial drying, are returned to the wooden barrel, in which are placed scraps of iron, which take up the chlorine, or they may be drawn into an iron pan. Quicksilver is then added and all the copper amalgamated and the cut quicksilver gathered. This amalgam is strained and run with a settler, and will give upon retorting the greater part of the copper which was originally contained in the amalgam. The gold and silver amalgam which has been drawn off and strained is retorted, and the gold and silver melted into bars entirely free from copper, lead, and other impurities.

This process is rapid and cheap, while the gold, silver, and copper are obtained separately.

Having thus described my invention, what what I claim is—

The process of refining amalgam, which consists in subjecting the amalgam under agitation to the action of chlorine gas, whereby the base metals in said amalgam are transferred into insoluble chlorides, and then separating such chlorides from the amalgam, substantially as and for the purpose set forth.

In testimony that I claim the foregoing as my own I have hereto affixed my signature in presence of two witnesses.

EUGENE N. RIOTTE.

Witnesses:
 MYRON HUME,
 WILLIAM H. CLARKSON.